(12) United States Patent
Kaltenbach et al.

(10) Patent No.: US 12,404,915 B2
(45) Date of Patent: Sep. 2, 2025

(54) DRIVE UNIT FOR A VEHICLE

(71) Applicant: ZF Friedrichshafen AG, Friedrichshafen (DE)

(72) Inventors: Johannes Kaltenbach, Friedrichshafen (DE); Thomas Martin, Weissenberg (DE); Fabian Kutter, Kressbronn (DE); Johannes Glückler, Friedrichshafen (DE); Kai Bornträger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/743,718

(22) Filed: Jun. 14, 2024

(65) Prior Publication Data

US 2024/0418244 A1    Dec. 19, 2024

(30) Foreign Application Priority Data

Jun. 16, 2023   (DE) ................. 10 2023 205 680.1

(51) Int. Cl.
*F16H 3/66*      (2006.01)
*F16H 63/32*     (2006.01)

(52) U.S. Cl.
CPC ............ *F16H 3/66* (2013.01); *F16H 63/32* (2013.01); *F16H 2063/324* (2013.01);
(Continued)

(58) Field of Classification Search
CPC ...... F16H 3/66; F16H 63/32; F16H 2063/324; F16H 2200/0021; F16H 2200/2007;
(Continued)

(56) References Cited

U.S. PATENT DOCUMENTS

| 9,011,284 B2 | 4/2015 | Ziemer |
| 10,570,995 B2 | 2/2020 | Beck et al. |

(Continued)

FOREIGN PATENT DOCUMENTS

| DE | 10 2019 206 961 A1 | 11/2020 |
| DE | 10 2020 122 044 A1 | 2/2022 |

OTHER PUBLICATIONS

Machine translation of DE 102019206961 A1 (Year: 2020).*
(Continued)

*Primary Examiner* — Farhana Pervin
(74) *Attorney, Agent, or Firm* — Finch & Maloney PLLC (57) ABSTRACT

A vehicle drive unit has an electric machine and a manual gearbox with first and second shift elements and two planetary gear sets coupled to one another. Each gear set has a sun shaft, a ring gear shaft, and a web shaft. The second sun shaft is drivable by the electric machine and is configured as an output of the shift gear. The second ring gear shaft is connected rotationally fixed to the first web shaft, and the first sun shaft is connected rotationally fixed to a stationary component. When actuated, the first shift element connects the first ring gear shaft to an element of the first planetary gear set and/or of the second planetary gear set. When actuated, the second shift element connects the first ring gear shaft rotationally fixed to the second sun shaft or the second web shaft in order to shift a second gear.

18 Claims, 6 Drawing Sheets

(52) U.S. Cl.
CPC ............... *F16H 2200/0021* (2013.01); *F16H 2200/2007* (2013.01); *F16H 2200/2038* (2013.01); *F16H 2200/2094* (2013.01)

(58) Field of Classification Search
CPC ....... F16H 2200/2005; F16H 2200/201; F16H 2200/2038; F16H 2200/2035; F16H 2200/2094; F16H 2200/2064; F16H 2200/2097; Y02T 10/62
See application file for complete search history.

(56) References Cited

U.S. PATENT DOCUMENTS

| | | |
|---|---|---|
| 10,753,431 B2 * | 8/2020 | Beck ...................... B60K 6/387 |
| 11,135,914 B2 | 10/2021 | Glückler et al. |
| 11,353,091 B2 | 6/2022 | Renner |
| 2020/0384847 A1 * | 12/2020 | Beck ........................ F16H 3/66 |
| 2022/0009332 A1 * | 1/2022 | Beck ........................ B60K 6/44 |
| 2022/0065334 A1 * | 3/2022 | Martin ..................... B60K 1/00 |
| 2022/0111718 A1 | 4/2022 | Beck et al. |
| 2023/0339315 A1 * | 10/2023 | Engerman ............. F16H 37/082 |

OTHER PUBLICATIONS

German Patent Office, German Search Report issued in German patent application No. 10 2023 205 679.8 (Mar. 14, 2024).
German Patent Office, German Search Report issued in German patent application No. 10 2023 205 680.1 (Mar. 15, 2024).

\* cited by examiner

DRIVE UNIT FOR A VEHICLE

RELATED APPLICATIONS

This application claims the benefit of and right of priority under 35 U.S.C. § 119 to German Patent Application no. 10 2023 205 680.1 filed on 16 Jun. 2023, the contents of which are incorporated herein by reference in its entirety.

FIELD OF THE DISCLOSURE

The invention relates to a drive unit for a vehicle, wherein the drive unit comprises a single electric machine and a manual gearbox with a plurality of gears.

BACKGROUND

For example, DE 10 2019 206 961 A1 discloses a drive unit for an electric vehicle, comprising an electric machine and a two-speed manual gearbox with a first shift element, a second shift element, and two planetary gear sets coupled to one another. The first planetary gear set comprises a first sun shaft, a first hollow gear shaft, and a first web shaft. The second planetary gear set comprises a second sun shaft, a second hollow gear shaft, and a second web shaft. The first hollow gear shaft is permanently connected to the second web shaft. The first sun shaft is actuatable by the electric machine. The second sun shaft is fixed. The first web shaft forms the gear output shaft of the two-speed manual gearbox. The first shift element A can be actuated to shift the first gear. The second shift element can be actuated to shift the second gear.

SUMMARY

The task of the present invention is to provide an alternative drive unit for a vehicle, whereby the drive unit should in particular have a compact and energy-efficient design. The task is solved by a respective drive unit with the features disclosed herein. Advantageous further embodiments will be apparent from the following description and the figures.

A drive unit for a vehicle according to the invention comprises an electric machine and a manual transmission with at least a first shift element, a second shift element, and two planetary gear sets coupled to one another, wherein the first planetary gear set has a first sun shaft, a first ring gear shaft, and a first web shaft, wherein the second planetary gear set has a second sun shaft, a second ring gear shaft, and a second web shaft, wherein the second sun shaft can be driven by the electric machine, in particular is connected in a rotationally fixed manner to a drive shaft, wherein the second web shaft is set up as an output of the gearbox, in particular is non-rotatably connected to an output shaft, wherein the second ring gear shaft is non-rotatably connected to the first web shaft, wherein the first sun shaft is non-rotatably connected to a stationary component, wherein the first shift element, in an actuated state, connects the first ring gear shaft to the first web shaft and the second ring gear shaft in a rotationally fixed manner in order to shift a first gear, wherein the second shift element, in an actuated state, connects the first ring gear shaft to the second sun shaft in a rotationally fixed manner in order to shift a second gear. Reference is made to the embodiment shown in FIG. 2.

A further drive unit for a vehicle according to the invention comprises an electric machine and a gearbox with at least a first shift element, a second shift element, and two planetary gear sets coupled to one another, wherein the first planetary gear set has a first sun shaft, a first ring gear shaft, and a first web shaft, wherein the second planetary gear set has a second sun shaft, a second ring gear shaft, and a second web shaft, wherein the second sun shaft can be driven by the electric machine, in particular is connected in a rotationally fixed manner to a drive shaft, the second web shaft being set up as an output of the gearbox, in particular being non-rotatably connected to an output shaft, the second ring gear shaft being non-rotatably connected to the first web shaft, the first sun shaft being non-rotatably connected to a stationary component, the first shift element, in an actuated state, non-rotatably connecting the first ring gear shaft to a stationary component in order to shift a first gear, the second shift element, in an actuated state, non-rotatably connecting the first ring gear shaft to the second sun shaft in order to shift a second gear. Reference is made to the embodiment shown in FIG. 3.

A further drive unit for a vehicle according to the invention comprises an electric machine and a gearbox with at least a first shift element, a second shift element, and two planetary gear sets coupled to one another, wherein the first planetary gear set has a first sun shaft, a first ring gear shaft, and a first web shaft, wherein the second planetary gear set has a second sun shaft, a second ring gear shaft, and a second web shaft, wherein the second sun shaft can be driven by the electric machine, in particular is connected in a rotationally fixed manner to a drive shaft, the second web shaft being set up as an output of the gearbox, in particular being non-rotatably connected to an output shaft, the second ring gear shaft being non-rotatably connected to the first web shaft, the first sun shaft being non-rotatably connected to a stationary component, the first shift element, in an actuated state, non-rotatably connecting the first ring gear shaft to the second web shaft in order to shift a first gear, the second shift element, in an actuated state, non-rotatably connecting the first ring gear shaft to the second sun shaft in order to shift a second gear. Reference is made to the embodiment shown in FIG. 4.

A further drive unit for a vehicle according to the invention comprises an electric machine and a gearbox with at least a first shift element, a second shift element, and two planetary gear sets coupled to one another, wherein the first planetary gear set has a first sun shaft, a first ring gear shaft, and a first web shaft, wherein the second planetary gear set has a second sun shaft, a second ring gear shaft, and a second web shaft, wherein the second sun shaft can be driven by the electric machine, in particular is connected in a rotationally fixed manner to a drive shaft, the second web shaft being set up as an output of the gearbox, in particular being non-rotatably connected to an output shaft, the second ring gear shaft being non-rotatably connected to the first web shaft, the first sun shaft being non-rotatably connected to a stationary component, the first shift element, in an actuated state, non-rotatably connecting the first ring gear shaft to the second web shaft in order to shift a first gear, the second shift element, in an actuated state, non-rotatably connecting the second web shaft to the second sun shaft in order to shift a second gear. Reference is made to the embodiment shown in FIG. 5.

A further drive unit for a vehicle according to the invention comprises an electric machine and a gearbox with at least a first shift element, a second shift element, and two planetary gear sets coupled to one another, wherein the first planetary gear set has a first sun shaft, a first ring gear shaft, and a first web shaft, wherein the second planetary gear set has a second sun shaft, a second ring gear shaft, and a second web shaft, wherein the second sun shaft can be driven by the electric machine, in particular is connected in a rotationally fixed manner to a drive shaft, wherein the second web shaft is set up as an output of the gearbox, in particular is non-rotatably connected to an output shaft, wherein the second ring gear shaft is non-rotatably connected to the first web shaft, wherein the first sun shaft is non-rotatably connected to a stationary component, wherein the first shift element, in an actuated state, connects the first ring gear shaft to the second web shaft in a rotationally fixed manner in order to shift a first gear, wherein the second shift element, in an actuated state, connects the first web shaft and the second ring gear shaft to the second web shaft in a rotationally fixed manner in order to shift a second gear. Reference is made to the embodiment shown in FIG. 6.

A further drive unit for a vehicle according to the invention comprises an electric machine and a manual transmission with at least a first shift element, a second shift element, a third shift element, and two planetary gear sets coupled to one another, the first planetary gear set having a first sun shaft, a first ring gear shaft, and a first web shaft, the second planetary gear set having a second sun shaft, a second ring gear shaft, and a second web shaft, the second sun shaft being drivable by the electric machine, in particular being connected in a rotationally fixed manner to a drive shaft, the second web shaft being set up as an output of the gearbox, in particular being non-rotatably connected to an output shaft, wherein the second ring gear shaft is non-rotatably connected to the first web shaft, wherein the first sun shaft is non-rotatably connected to a stationary component, wherein the first shift element in an actuated state non-rotatably connects the first ring gear shaft to the first web shaft and the second ring gear shaft, in order to shift a first gear, the second shift element, in an actuated state, connecting the first ring gear shaft to the second web shaft in a rotationally fixed manner in order to shift a second gear, the third shift element, in an actuated state, connecting the first web shaft and the second ring gear shaft to the second web shaft in a rotationally fixed manner in order to shift a third gear. Reference is made to the embodiment shown in FIG. 7.

A further drive unit for a vehicle according to the invention comprises an electric machine and a manual transmission with at least a first shift element, a second shift element, a third shift element, and two planetary gear sets coupled to one another, the first planetary gear set having a first sun shaft, a first ring gear shaft, and a first web shaft, the second planetary gear set having a second sun shaft, a second ring gear shaft, and a second web shaft, the second sun shaft being drivable by the electric machine, in particular being connected in a rotationally fixed manner to a drive shaft, the second web shaft being set up as an output of the gearbox, in particular being non-rotatably connected to an output shaft, wherein the second ring gear shaft is non-rotatably connected to the first web shaft, wherein the first sun shaft is non-rotatably connected to a stationary component, wherein the first shift element, in an actuated state, non-rotatably connects the first ring gear shaft to a stationary component, in order to shift a first gear, the second shift element, in an actuated state, connecting the first ring gear shaft to the second web shaft in a rotationally fixed manner in order to shift a second gear, the third shift element, in an actuated state, connecting the first web shaft and the second ring gear shaft to the second web shaft in a rotationally fixed manner in order to shift a third gear. Reference is made to the embodiment shown in FIG. 8.

A further drive unit for a vehicle according to the invention comprises an electric machine and a manual transmission with at least a first shift element, a second shift element, a third shift element, and two planetary gear sets coupled to one another, the first planetary gear set having a first sun shaft, a first ring gear shaft, and a first web shaft, the second planetary gear set having a second sun shaft, a second ring gear shaft, and a second web shaft, the second sun shaft being drivable by the electric machine, in particular being connected in a rotationally fixed manner to a drive shaft, the second web shaft being set up as an output of the gearbox, in particular non-rotatably connected to an output shaft, wherein the second ring gear shaft is non-rotatably connected to the first web shaft, wherein the first sun shaft is non-rotatably connected to a stationary component, wherein the first shift element in an actuated state non-rotatably connects the first ring gear shaft to the first web shaft and the second ring gear shaft, in order to shift a first gear, the second shift element, in an actuated state, connecting the first ring gear shaft to the second sun shaft in a rotationally fixed manner in order to shift a second gear, the third shift element, in an actuated state, connecting the first web shaft and the second ring gear shaft to the second sun shaft in a rotationally fixed manner in order to shift a third gear. Reference is made to the embodiment shown in FIG. 9.

A further drive unit for a vehicle according to the invention comprises an electric machine and a manual transmission with at least a first shift element, a second shift element, a third shift element, and two planetary gear sets coupled to one another, the first planetary gear set having a first sun shaft, a first ring gear shaft, and a first web shaft, the second planetary gear set having a second sun shaft, a second ring gear shaft, and a second web shaft, the second sun shaft being drivable by the electric machine, in particular being connected in a rotationally fixed manner to a drive shaft, the second web shaft being set up as an output of the gearbox, in particular being non-rotatably connected to an output shaft, wherein the second ring gear shaft is non-rotatably connected to the first web shaft, wherein the first sun shaft is non-rotatably connected to a stationary component, wherein the first shift element in an actuated state non-rotatably connects the first ring gear shaft to a stationary component in order to shift a first gear, wherein the second shift element, in an actuated state, connects the first ring gear shaft to the second sun shaft in a rotationally fixed manner in order to shift a second gear, wherein the third shift element, in an actuated state, connects the first web shaft and the second ring gear shaft to the second sun shaft in a rotationally fixed manner in order to shift a third gear. Reference is made to the embodiment shown in FIG. 10.

A further drive unit for a vehicle according to the invention comprises an electric machine and a manual transmission with at least a first shift element, a second shift element, a third shift element, and two planetary gear sets coupled to one another, the first planetary gear set having a first sun shaft, a first ring gear shaft, and a first web shaft, the second planetary gear set having a second sun shaft, a second ring gear shaft, and a second web shaft, the second sun shaft being drivable by the electric machine, in particular being connected in a rotationally fixed manner to a drive shaft, the second web shaft being set up as an output of the gearbox, in particular being non-rotatably connected to an output shaft, wherein the second ring gear shaft is non-rotatably connected to the first web shaft, wherein the first sun shaft is non-rotatably connected to a stationary component, wherein the first shift element, in an actuated state, non-rotatably connects the first ring gear shaft to a stationary component, in order to shift a first gear, the second shift element, in an actuated state, connecting the first ring gear shaft to the second sun shaft in a rotationally fixed manner in order to shift a second gear, the third shift element, in an actuated state, connecting the second web shaft to the second sun shaft in a rotationally fixed manner in order to shift a third gear. Reference is made to the embodiment shown in FIG. 11.

A further drive unit for a vehicle according to the invention comprises an electric machine and a manual transmission with at least a first shift element, a second shift element, a third shift element, and two planetary gear sets coupled to one another, the first planetary gear set having a first sun shaft, a first ring gear shaft, and a first web shaft, the second planetary gear set having a second sun shaft, a second ring gear shaft, and a second web shaft, the second sun shaft being drivable by the electric machine, in particular being connected in a rotationally fixed manner to a drive shaft, the second web shaft being set up as an output of the gearbox, in particular being non-rotatably connected to an output shaft, wherein the second ring gear shaft is non-rotatably connected to the first web shaft, wherein the first sun shaft is non-rotatably connected to a stationary component, wherein the first shift element non-rotatably connects the first ring gear shaft to the second web shaft in an actuated state, in order to shift a first gear, the second shift element, in an actuated state, connecting the first ring gear shaft to the second sun shaft in a rotationally fixed manner in order to shift a second gear, the third shift element, in an actuated state, connecting the second web shaft to the second sun shaft in a rotationally fixed manner in order to shift a third gear. Reference is made to the embodiment shown in FIG. 12.

The manual gearbox enables the connection of a single electric machine to initiate drive power via the drive shaft. The manual gearbox is connected to a differential or a vehicle wheel via the output shaft with an actuating effect. The manual gearbox is actuated via the second sun shaft, wherein the output is via the second web shaft. The second sun shaft is connected to the electric machine with an actuating effect. The second web shaft is connected to at least one vehicle wheel with an actuating effect. For example, a single drive unit is used in an electric drive axle for an electric vehicle, wherein the output shaft is then connected to a differential with an actuating effect. Alternatively, two drive units can be used in an electric drive axle for an electric vehicle, wherein the respective output shaft is then connected to the respective vehicle wheel of the drive axle with an actuating effect. The manual gearbox has two or three gears that are shifted by means of the shift elements, creating high energy efficiency for electric vehicles.

The first shift element can be actuated to shift the first gear. The second shift element can be actuated to shift the second gear. The third shift element can be actuated to shift the third gear.

A "shift element" is a shiftable device which, in a closed state, connects two shafts or a shaft and a stationary component in a rotationally fixed manner and, in an open state, decouples the two shafts or the shaft and the stationary component from one another. Two shafts can then rotate relative to one another. A "stationary component" is a component that is fixed in a stationary position, in particular is connected to a part of a housing in a rotationally fixed or integral manner. The shift elements are configured as gear shift elements and are thus configured for shifting gears.

For the purposes of the invention, a "shaft" is to be understood as a rotatable component of the transmission, via which associated components of the transmission are connected to each other in a rotationally fixed manner or via which such a connection can be made when one of the shift elements is actuated. The respective shaft can connect the components to one another axially or radially or even both axially and radially. The respective shaft can therefore also be present as an intermediate element by which a respective component is connected, for example, radially. The term "shaft" does not exclude the possibility that the components to be connected may be designed in one piece. In particular, two or more shafts connected to each other in a rotationally fixed manner can be designed in one piece.

According to a preferred embodiment, all shift elements are designed as interlocking shift elements. For example, an interlocking shift element is designed as a claw clutch. Interlocking shift elements can increase the efficiency of the drive unit due to reduced drag losses. In particular, interlocking shift elements are more compact and optimized in terms of efficiency and have a cost advantage over frictionally engaged shift elements.

According to a preferred embodiment, the first shift element and the second shift element are combined to form a shifting unit with three shift positions, the shifting unit having a single axially displaceable sliding sleeve. The sliding sleeve is axially movable into the respective shift position by means of a single actuator. Preferably, the sliding sleeve is arranged in a rotationally fixed manner on the first hollow gear shaft in all three shift positions. Alternatively, the sliding sleeve is fixed to the second web shaft in all three shift positions. Preferably, the shift unit has a neutral position between two gear positions, so that two gear positions and one neutral position are provided for three shift positions. In a neutral position, two shafts are decoupled from one another via the shift unit.

According to a preferred embodiment, the first shift element, the second shift element, and the third shift element are combined to form a shift unit with five shift positions, wherein the shift unit has a single axially movable sliding sleeve. The sliding sleeve is axially movable into the respective shift position by means of a single actuator. Preferably, the shift unit has a neutral position between two gear positions, so that three gear positions and two neutral positions are provided for five shift positions. In a neutral position, two shafts are decoupled from one another via the shift unit.

In particular, a single actuator moves the sliding sleeve into the respective shift position and thereby shifts two or three gears sequentially, depending on the embodiment. Preferably, the sliding sleeve has interlocking claws which, in the respective gear position, interact positively with a respective corresponding claw toothing in order to set a rotationally fixed connection between two shafts or a shaft and the housing. The respective claw toothing, with which the sliding sleeve interacts in an interlocking manner, is therefore to be understood as a shift element. In particular, the sliding sleeve is arranged axially between two gear positions in a respective neutral position, so that a change between the gears always requires a passage through a neutral position. Preferably, the shift unit comprises an unsynchronized claw clutch.

According to a preferred embodiment, the drive unit further comprises a differential with a differential input shaft, which is at least indirectly connected to the second web shaft, and two differential output shafts.

For example, the differential is designed as a bevel gear differential. A differential designed as a bevel gear differential has two output elements on the wheel side, in particular a first output gear and a second output gear. The two output gears each mesh with a balancing element. The balancing elements are mounted in a differential cage so that they can rotate about their own axis. The respective output gear is connected to the respective differential output shaft in a rotationally fixed manner. The differential is driven via the differential cage, which is configured as a differential input shaft. The drive power fed into the differential gear is distributed to the differential output shafts and transmitted to the drive gears of the axle. The differential output shafts are configured to be connected to the drive gears of the vehicle with an actuating effect. The respective differential output shaft can be connected directly or indirectly via a joint, a joint shaft, and/or a wheel hub to the associated vehicle wheel.

For example, the differential is designed as an integral differential with a first planetary gear set and a second planetary gear set. An "integral differential" is a differential with a first planetary gear set and a second planetary gear set that is operatively connected to the first planetary gear set. The first planetary gear set of the integral differential is connected with actuating effect to the output shaft of the manual gearbox, in particular to the second web shaft, and is also connected with actuating effect to the second planetary gear set of the integral differential and at least indirectly to the first differential output shaft. The second planetary gear set of the integral differential is also connected to the second differential output shaft with an actuating effect and is supported on a stationary component, in particular on a housing component. By means of such an integral differential, the input torque, which is introduced into the integral differential, can be converted and distributed to the two differential output shafts in a defined ratio. In particular, half of the input torque is transferred to the two differential output shafts.

According to a preferred embodiment, the drive unit further comprises a third planetary gear set designed as a constant transmission stage with a third sun shaft, a third hollow gear shaft, and a third web shaft. For example, the third sun shaft is connected to the second web shaft in a rotationally fixed manner, wherein the output shaft is connected to the third web shaft in a rotationally fixed manner, wherein the hollow gear shaft is connected to the stationary component in a rotationally fixed manner. Multiple planetary gears are rotatably mounted on the third web shaft and engage in tooth mesh with the third sun shaft and the third hollow gear shaft.

According to a preferred embodiment, the first planetary gear set and the second planetary gear set are arranged axially adjacent to one another. Preferably, the first planetary gear set is arranged axially between the second and third planetary gear sets. Consequently, there are no other components axially between the respective planetary gear sets.

According to a preferred embodiment, the electric machine is arranged at a first axial end section of the manual gearbox, wherein the output shaft is arranged at a second axial end section of the manual gearbox formed in the opposite direction. This means that the electric machine and the output shaft are spaced as far apart as possible in the axial direction. Alternatively, the electric machine is arranged at a first axial end section of the manual gearbox, wherein the output shaft is guided axially through the electric machine and is also arranged at the first axial end section of the manual gearbox. Consequently, the drive shaft, which is connected to the rotor of the electric machine in a rotationally fixed manner, for example, is designed as a hollow shaft and is configured for axial passage of the output shaft.

A vehicle according to the invention comprises at least one drive unit according to the invention. The above definitions and explanations of technical effects, advantages, and advantageous embodiments of the drive unit according to the invention also apply mutatis mutandis to the vehicle according to the invention.

BRIEF DESCRIPTION OF THE DRAWINGS

Advantageous embodiments of the invention, which are explained below, are shown in the drawings, wherein identical or similar elements are provided with the same reference numerals. The following are shown.

DETAILED DESCRIPTION

Figure 1:
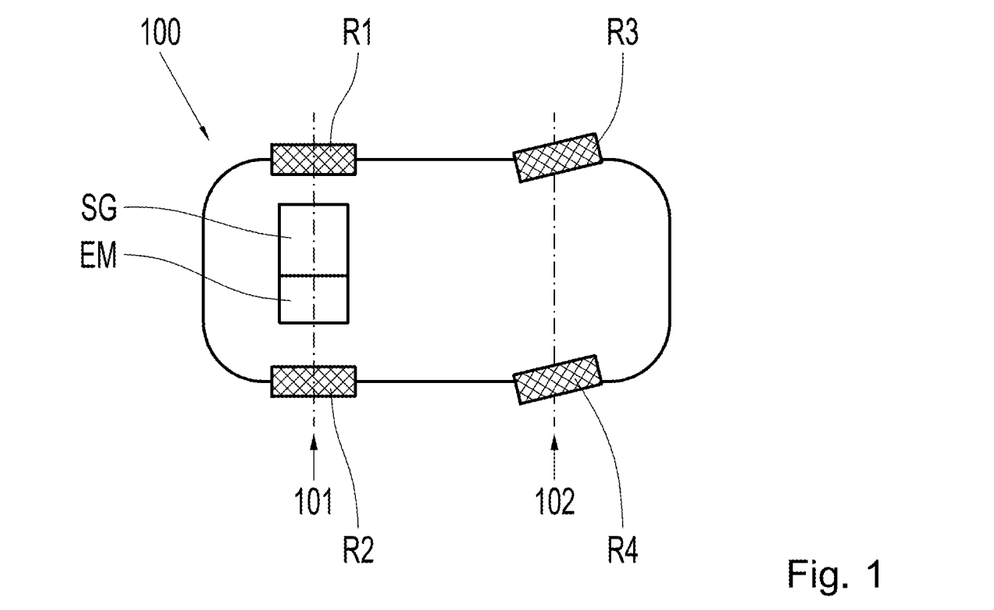
FIG. 1 a highly abstract schematic view of a vehicle with a drive axle, which has a drive unit according to the invention.

FIG. 1 shows a vehicle 100 with a first axle 101 with two vehicle wheels R1, R2 and a second axle 102 with two vehicle wheels R3, R4. In the present case, the first axle 101 is designed as the rear drive axle of the vehicle 100 and is equipped with a drive unit according to the invention. The drive unit comprises an electric machine EM, which is set up to generate drive power, and a manual gearbox SG with several gears. The vehicle 100 is therefore designed as an electric vehicle, i.e., a vehicle that can be driven electrically. The drive unit is arranged transversely to the longitudinal direction of the vehicle and is connected to the vehicle wheels R1, R2 of the first axle 101 with an actuating effect. In the present case, no further drive unit is arranged on the second axle 102, i.e., on the front axle of the motor vehicle 100, which saves costs, weight, and installation space. Alternatively, the drive unit can be arranged on the front axle of the motor vehicle 100 instead of on the rear axle. To implement an all-wheel drive system, a further drive unit can be arranged on the second axle 102 and connected to the vehicle wheels R3, R4 of this axle 102 with an actuating effect.

Figure 2:
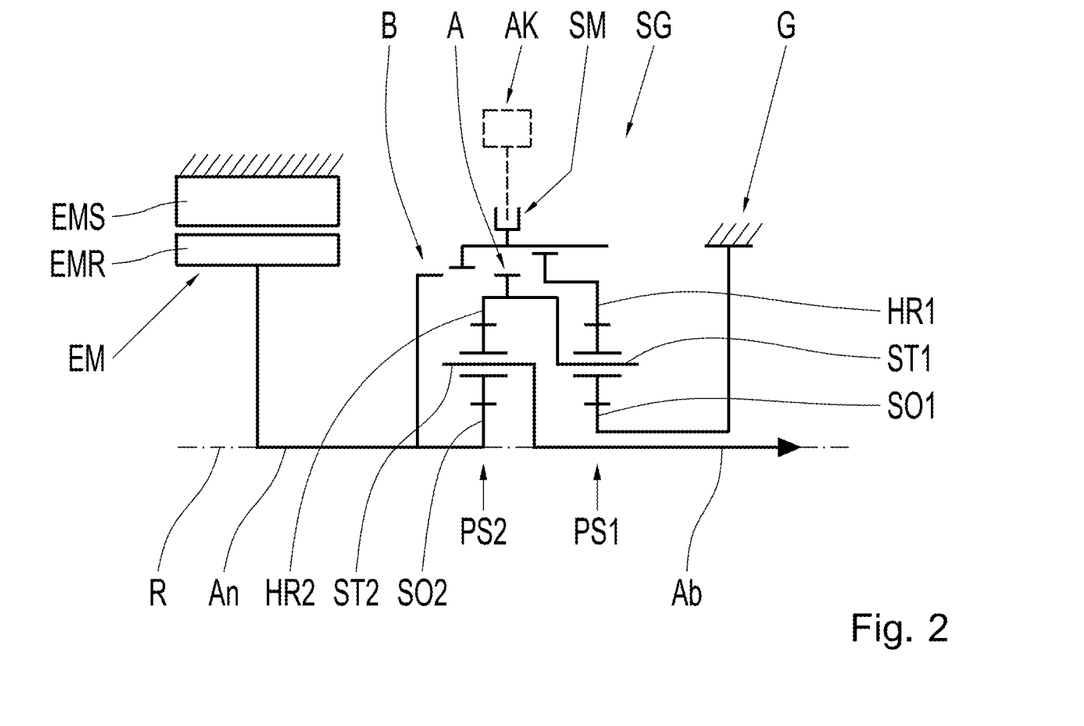
FIG. 2 a highly abstract schematic view of a drive unit according to the invention in accordance with a first embodiment.

According to FIG. 2, the drive unit comprises an electric machine EM with a fixed stator EMS and a rotatable rotor EMR as well as a gearbox SG with a first shift element A, a second shift element B, and two coupled planetary gear sets PS1, PS2. Both shift elements A, B are designed as interlocking shift elements, which saves installation space and increases efficiency. The first planetary gear set PS1 comprises three shafts, namely a first sun shaft SO1, a first hollow gear shaft HR1, and a first web shaft ST1. The first web shaft ST1 carries multiple planetary gears which mesh with the first sun shaft SO1 and with the first hollow gear shaft HR1, i.e., engage in a tooth mesh. The second planetary gear set PS2 also comprises three shafts, namely a second sun shaft SO2, a second hollow gear shaft HR2, and a second web shaft ST2. The second web shaft ST2 carries multiple planetary gears that mesh with the second sun shaft SO2 and the second hollow gear shaft HR2, i.e., engage in a tooth mesh. Furthermore, the two planetary gear sets PS1, PS2 are arranged axially adjacent to each other.

The second sun shaft SO2 is connected to the rotor EMR of the electric machine EM in a rotationally fixed manner via a drive shaft An and is thus actuatable by the electric machine EM. The second web shaft ST2 is configured as the output of the manual gearbox SG and is connected to an output shaft Ab in a rotationally fixed manner. The drive shaft An is arranged on one side of the drive unit and the output shaft Ab is arranged on an opposite side of the drive unit, wherein the drive shaft An and the output shaft Ab do not axially overlap each other. The output shaft Ab can be connected indirectly, for example via a differential, or directly to at least one drive gear of the vehicle with an actuating effect. For example, a drive device can be provided for each drive gear of the vehicle.

The second hollow gear shaft HR2 is connected to the first web shaft ST1 in a rotationally fixed manner. In particular, the second hollow gear shaft HR2 and the first web shaft ST1 form a coupling shaft between the two planetary gear sets PS1, PS2. The first sun shaft SO1 is connected to a stationary component designed as the housing G of the drive device in a rotationally fixed manner. Consequently, the first sun shaft SO1 is stationary and thus prevented from rotating. The drive unit has a rotational axis of symmetry R, which coincides with the drive shaft An and the output shaft Ab. The electric machine EM and the gearbox SG are arranged coaxially to the drive shaft An and the output shaft Ab and thus rotate about the axis of symmetry R. FIG. 2 and the following figures show only the "upper" half of the drive unit, whereby the "lower" half, not shown, is symmetrical to the "upper" half.

The first shift element A and the second shift element B are combined to form a shifting unit with three shift positions, the shifting unit having a single axially displaceable sliding sleeve SM with which the three shift positions are realized. The sliding sleeve SM is arranged on the first hollow gear shaft HR1 in a rotationally fixed manner and is axially movable into the respective shift position by means of a single actuator AK. Consequently, all three shift positions of the shifting unit are arranged linearly and consist of two gear positions and one neutral position, with the shifting unit having the neutral position between the two gear positions. Gears one and two are therefore shifted one after the other or sequentially by moving the sliding sleeve SM in an axial direction, in each case via the neutral position. This not only saves weight and components, but also costs, installation space, and assembly work.

First gear is engaged when the sliding sleeve SM is in a first gear position, i.e., in a first shift position. In an actuated state, i.e., in the first shift position of the sliding sleeve SM, the first shift element A connects the first hollow gear shaft HR1 with the first web shaft ST1 in order to shift the first gear. This fixes the first planetary gear set PS1.

The first gear is selected by moving the sliding sleeve SM axially into the neutral position, i.e., into a second shift position. In the second shift position of the sliding sleeve SM, the first hollow gear shaft HR1 and the first web shaft ST1 have no rotationally fixed connection to each other via the sliding sleeve SM and are thus decoupled from one another via the sliding sleeve SM. In the first neutral position, the sliding sleeve SM is only in rotary engagement with the first hollow gear shaft HR1. This second shift position of the sliding sleeve SM is shown in FIG. 2.

The second gear is engaged by moving the sliding sleeve SM axially into a second gear position, i.e., into a third shift position. In an actuated state, i.e., in the third shift position of the sliding sleeve SM, the second shift element B connects the first ring gear shaft HR1 with the second sun shaft SO2 in order to shift to second gear. As a result, the first hollow gear shaft HR1 rotates at the drive speed that was introduced to the drive shaft An by the electric machine EM.

Figure 3:
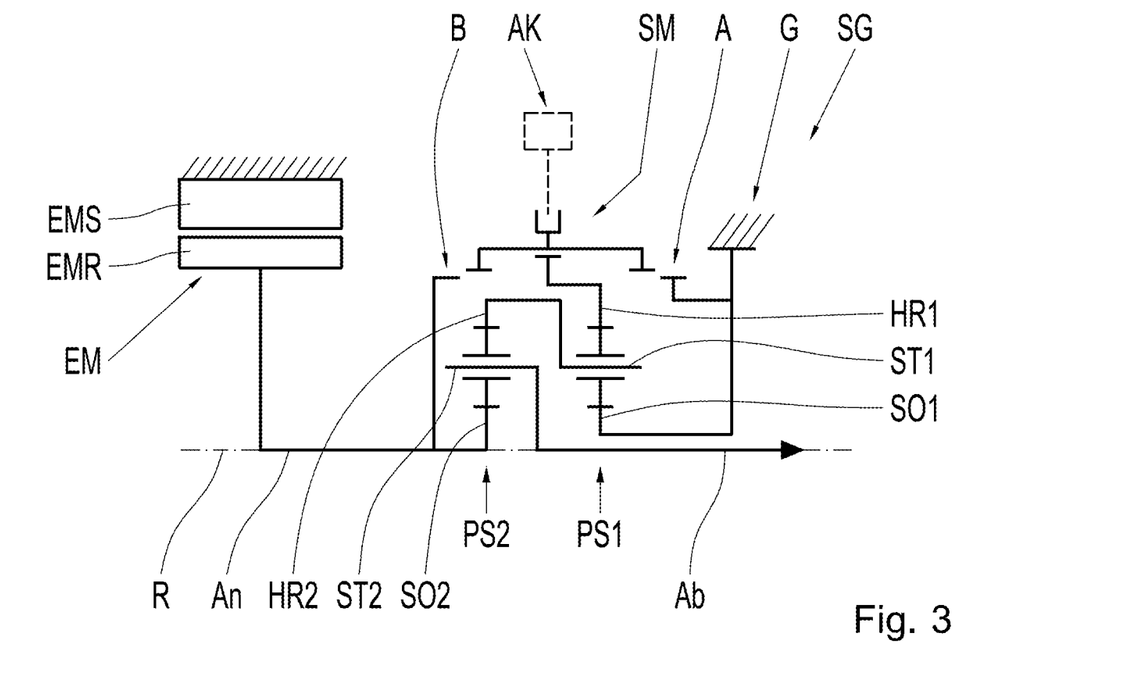
FIG. 3 a highly abstract schematic view of a drive unit according to the invention according to a second embodiment.

FIG. 3 shows a second embodiment of a drive unit according to the invention. The drive unit according to FIG. 3 essentially corresponds to the drive unit according to FIG. 2, wherein there is a difference between these two embodiments in the representation or realization of the first gear. This embodiment represents a locking variant for the first planetary gear set PS1. In order to shift a first gear, the first shift element A connects the first hollow gear shaft HR1 to the stationary component in the form of a housing G in an actuated state. Consequently, the first ring gear shaft HR1 is fixed stationary, causing the first planetary gear set PS1 to rotate in the block. Shift positions two and three and the function remain unchanged compared to the embodiment shown in FIG. 2. The second shift position of the sliding sleeve SM is shown in FIG. 3. A further locking variant for the first planetary gear set PS1, which is not shown in the figure, can be achieved by the first shift element A connecting the first web shaft ST1 to the housing G in a rotationally fixed manner. However, this locking variant does not allow a sliding sleeve SM, which is always connected to the first hollow gear shaft HR1. Otherwise, the exemplary embodiment according to FIG. 3 corresponds to the exemplary embodiment according to FIG. 2, to which reference is made.

Figure 4:
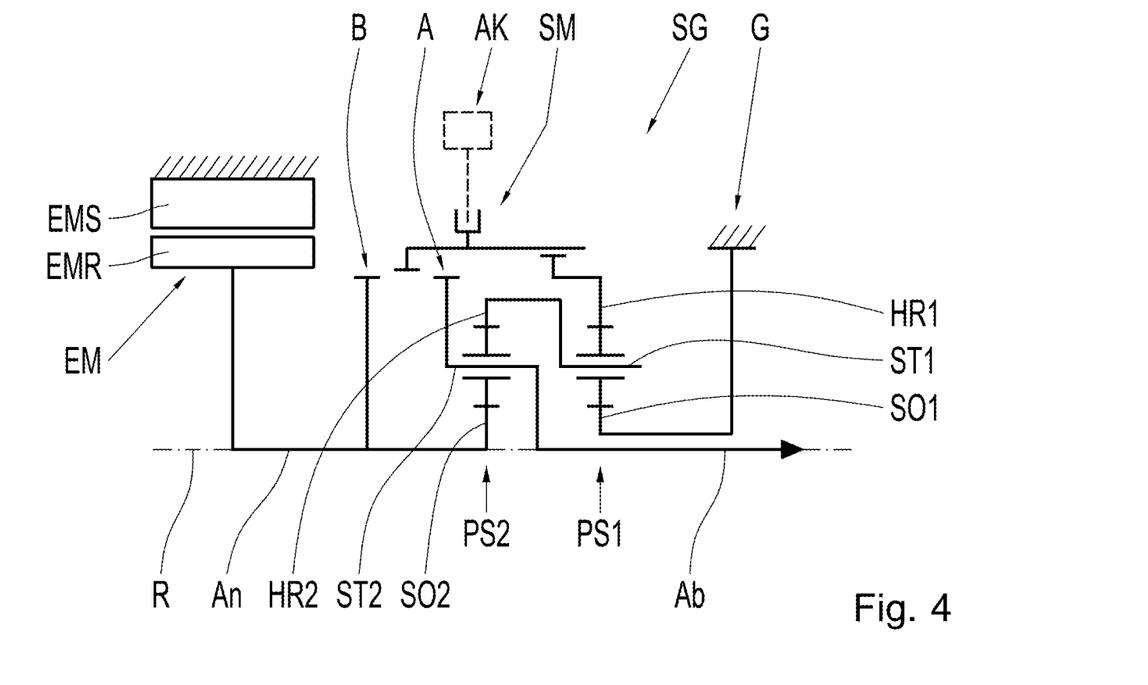
FIG. 4 a highly abstract schematic view of a drive unit according to the invention in accordance with a third embodiment.

FIG. 4 shows a third embodiment of a drive unit according to the invention. The drive unit according to FIG. 4 essentially corresponds to the drive unit according to FIG. 2, wherein there is a difference between these two embodiments in the representation or realization of the first gear. In order to shift a first gear, the first shift element A connects the first ring gear shaft HR1 with the second web shaft ST2 in an actuated state. Shift positions two and three and the function remain unchanged compared to the embodiment shown in FIG. 2. The second shift position of the sliding sleeve SM is shown in FIG. 4. Otherwise, the exemplary embodiment according to FIG. 4 corresponds to the exemplary embodiment according to FIG. 2, to which reference is made.

Figure 5:
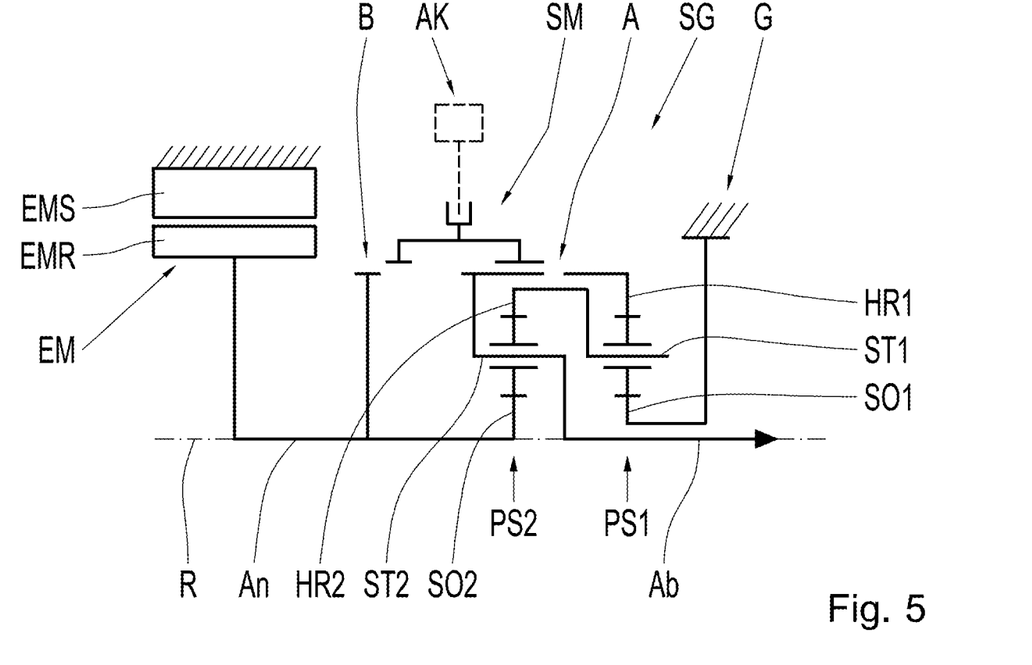
FIG. 5 a highly abstract schematic view of a drive unit according to the invention according to a fourth embodiment.

FIG. 5 shows a fourth embodiment of a drive unit according to the invention. The drive unit according to FIG. 5 essentially corresponds to the drive unit according to FIG.

4, whereby one difference between these two embodiments lies in the representation or realization of the second gear. To shift to a second gear, the second shift element B connects the second web shaft ST2 to the second sun shaft SO2 in an actuated state. The shift position one and the function remain unchanged compared to the embodiment shown in FIG. 4. The first gear is selected by moving the sliding sleeve SM axially into the neutral position, i.e., into a second shift position. In this neutral position, the sliding sleeve SM is only in rotary engagement with the second stay shaft ST2. The second shift position of the sliding sleeve SM is shown in FIG. 5. Otherwise, the embodiment example according to FIG. 5 corresponds to the embodiment example according to FIG. 4, to which reference is made.

Figure 6:
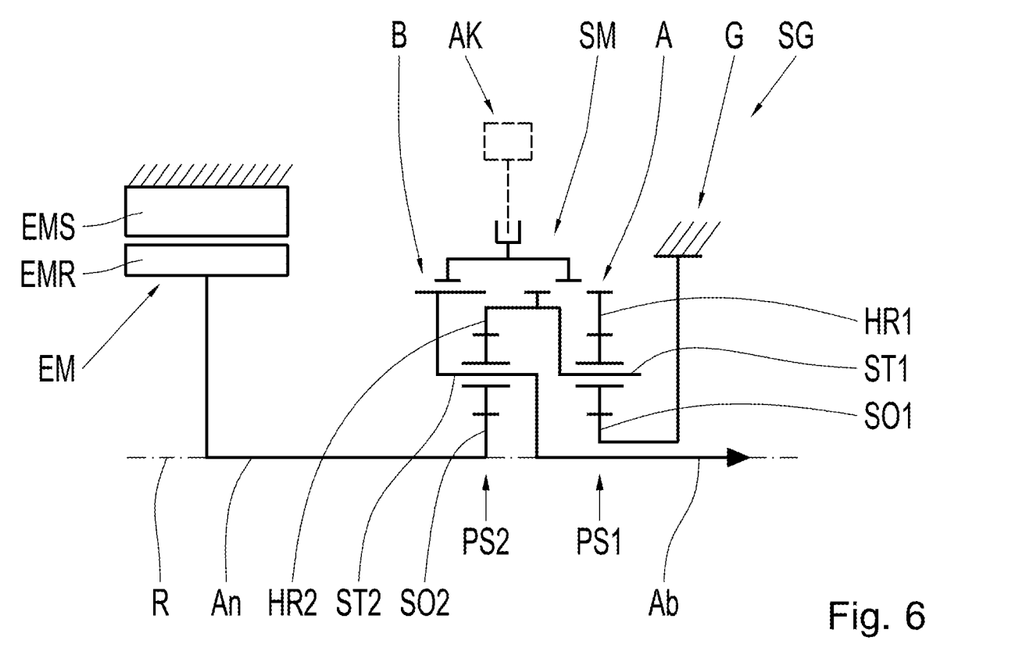
FIG. 6 a highly abstract schematic view of a drive unit according to the invention according to a fifth embodiment.

FIG. 6 shows a fifth embodiment of a drive unit according to the invention. The drive unit according to FIG. 6 essentially corresponds to the drive unit according to FIG. 5, although there is a difference between these two embodiments in the representation or realization of the second gear. This embodiment represents a locking variant for the second planetary gear set PS2. In order to shift to a second gear, the second shift element B connects the second web shaft ST2 with the second ring gear shaft HR2 in an actuated state. The shift positions one and two as well as the function remain unchanged compared to the embodiment shown in FIG. 5. The second shift position of the sliding sleeve SM is shown in FIG. 6. Otherwise, the embodiment example according to FIG. 6 corresponds to the embodiment example according to FIG. 5, to which reference is made.

Figure 7:
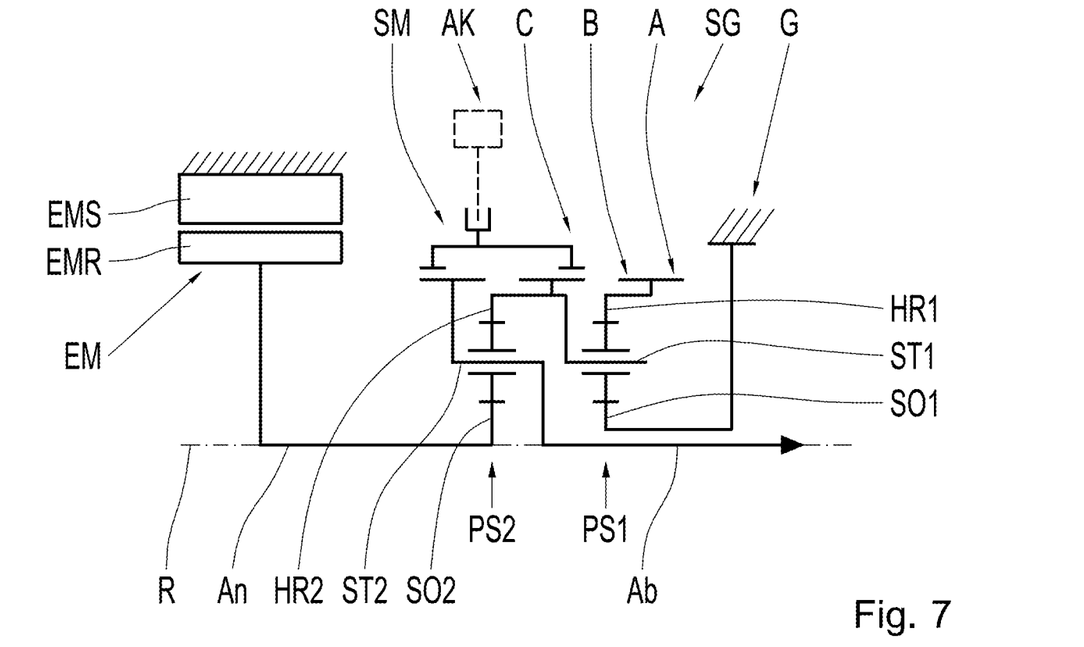
FIG. 7 a highly abstract schematic view of a drive unit according to the invention according to a sixth embodiment.

FIG. 7 shows a sixth embodiment of a drive unit according to the invention. The drive unit according to FIG. 7 essentially corresponds to the drive unit according to FIG. 2, whereby one difference between these two embodiments is the arrangement of a further shift element to form a third gear. In the present case, the manual gearbox SG not only has the first and second shift elements A, B, but also a third shift element C. All three shift elements A, B, C are designed as positive-locking shift elements. The first shift element A, the second shift element B, and the third shift element C form a shifting unit with five shift positions, the shifting unit having a single axially displaceable sliding sleeve SM with which the five shift positions are realized. The sliding sleeve SM can be moved axially into the respective shift position by means of a single actuator AK. Consequently, the five shift positions of the shifting unit are arranged linearly and consist of three gear positions and two neutral positions, with the shifting unit having exactly one neutral position between two gear positions. Gears one to three are therefore shifted one after the other or sequentially by moving the sliding sleeve SM in an axial direction, in each case via neutral positions. This not only saves weight and components, but also costs, installation space, and assembly work.

First gear is engaged when the sliding sleeve SM is in a first gear position, i.e., in a first shift position. In an actuated state, i.e., in the first shift position of the sliding sleeve SM, the first shift element A connects the first hollow gear shaft HR1 with the first web shaft ST1 in order to shift the first gear. This fixes the first planetary gear set PS1.

The first gear is selected by moving the sliding sleeve SM axially into a first neutral position, i.e., into a second shift position. In the second shift position of the sliding sleeve SM, the first hollow gear shaft HR1 and the first web shaft ST1 have no rotationally fixed connection to each other via the sliding sleeve SM and are thus decoupled from one another via the sliding sleeve SM. In the first neutral position, the sliding sleeve SM is only in rotary engagement with the first hollow gear shaft HR1.

The second gear is engaged by moving the sliding sleeve SM axially into a second gear position, i.e., into a third shift position. In an actuated state, i.e., in the third shift position of the sliding sleeve SM, the second shift element B connects the first ring gear shaft HR1 with the second web shaft ST2 in order to shift to second gear.

The second gear is selected by moving the sliding sleeve SM axially into a second neutral position, i.e., into the fourth shift position. In the fourth shift position of the sliding sleeve SM, the first hollow gear shaft HR1 and the second web shaft ST2 have no rotationally fixed connection to each other via the sliding sleeve SM and are therefore decoupled from one another via the sliding sleeve SM. In the second neutral position, the sliding sleeve SM is in rotary engagement with the second stay shaft ST2.

The third gear is engaged by moving the sliding sleeve SM axially into a third gear position, i.e., into a fifth shift position. In an actuated state, i.e., in the fifth shift position of the sliding sleeve SM, the third shift element C connects the second ring gear shaft HR2 with the second web shaft ST2 in order to shift to third gear. This blocks the second planetary gear set PS2. The fifth shift position of the sliding sleeve SM is shown in FIG. 7. Otherwise, the exemplary embodiment according to FIG. 7 corresponds to the exemplary embodiment according to FIG. 2, to which reference is made.

Figure 8:
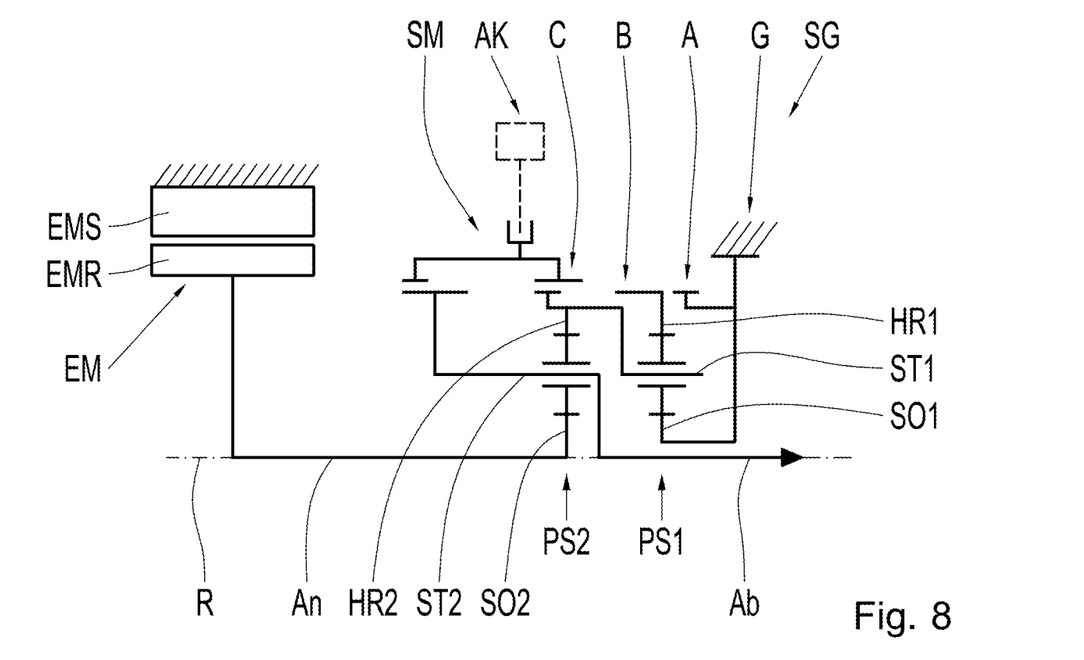
FIG. 8 a highly abstract schematic view of a drive unit according to the invention according to a seventh embodiment.

FIG. 8 shows a seventh embodiment of a drive unit according to the invention. The drive unit according to FIG. 8 essentially corresponds to the drive unit according to FIG. 7, wherein there is a difference between these two embodiments in the representation or realization of the first gear. This embodiment represents a locking variant for the first planetary gear set PS1. In order to shift a first gear, the first shift element A connects the first hollow gear shaft HR1 to the stationary component in the form of a housing G in an actuated state. Consequently, the first hollow gear shaft HR1 is fixed in a stationary position. Shift positions two to five and the function remain unchanged compared to the embodiment shown in FIG. 7. The fifth shift position of the sliding sleeve SM is shown in FIG. 8. Otherwise, the exemplary embodiment according to FIG. 8 corresponds to the exemplary embodiment according to FIG. 7, to which reference is made.

Figure 9:
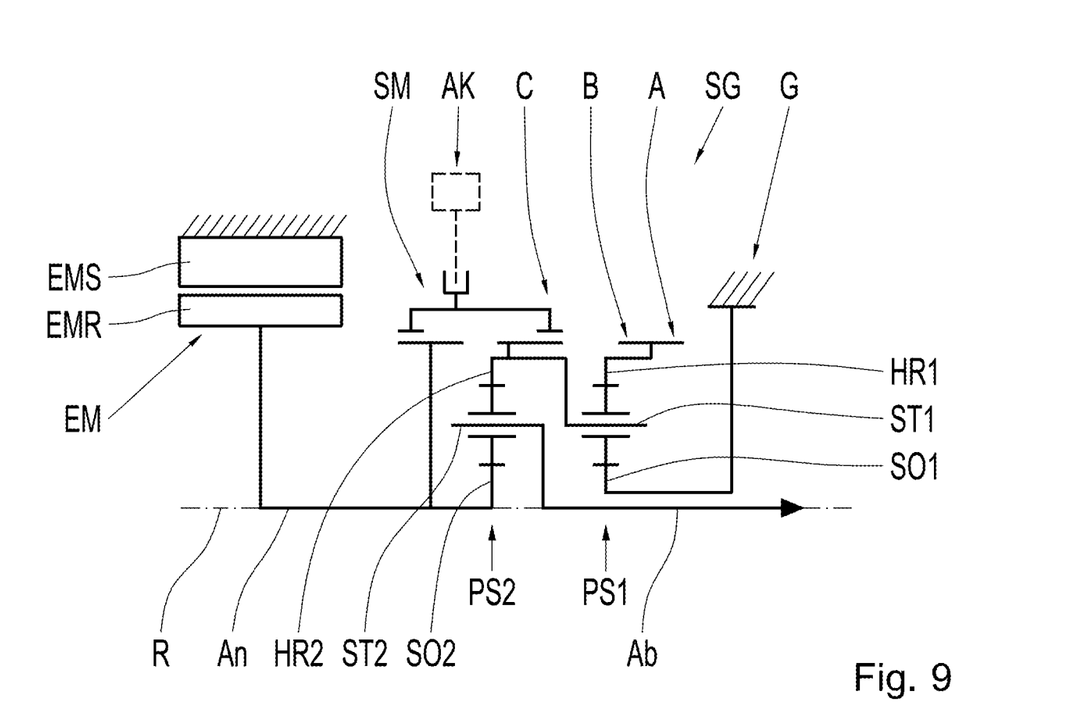
FIG. 9 a highly abstract schematic view of a drive unit according to the invention according to an eighth embodiment.

FIG. 9 shows an eighth embodiment of a drive unit according to the invention. The drive unit according to FIG. 9 essentially corresponds to the drive unit according to FIG. 7, although there is a difference between these two embodiments in the representation or realization of the second and third gears. In order to shift to a second gear, the second shift element B connects the first ring gear shaft HR1 with the second sun shaft SO2 in an actuated state. In order to shift to a third gear, the third shift element C connects the second ring gear shaft HR2 with the second sun shaft SO2 in an actuated state, whereby the second planetary gear set PS2 is locked. Shift positions one and two as well as the function remain unchanged compared to the embodiment shown in FIG. 7. The second gear is selected by moving the sliding sleeve SM axially into a second neutral position, i.e., into the fourth shift position. In the second neutral position, the sliding sleeve SM is only in rotary engagement with the second sun shaft SO2. The fifth shift position of the sliding sleeve SM is shown in FIG. 9. Otherwise, the exemplary embodiment according to FIG. 9 corresponds to the exemplary embodiment according to FIG. 7, to which reference is made.

Figure 10:
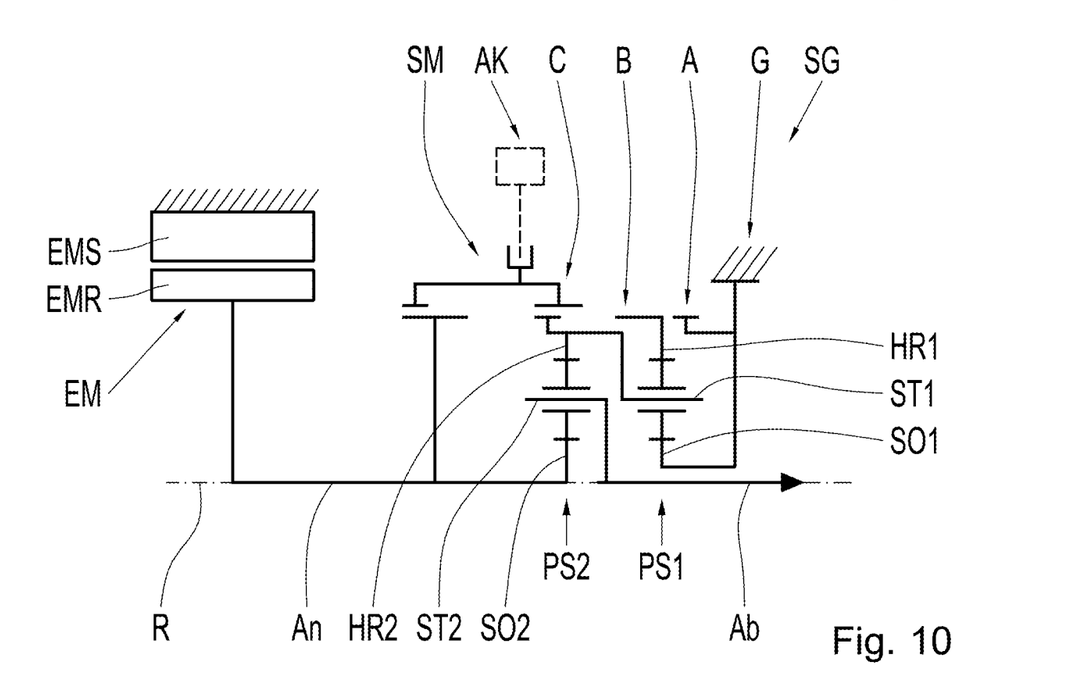
FIG. 10 a highly abstract schematic view of a drive unit according to the invention according to a ninth embodiment.

FIG. 10 shows a ninth embodiment of a drive unit according to the invention. The drive unit according to FIG.

10 essentially corresponds to the drive unit according to FIG. 9, wherein there is a difference between these two embodiments in the representation or realization of the first gear. This embodiment represents a locking variant for the first planetary gear set PS1. In order to shift a first gear, the first shift element A connects the first hollow gear shaft HR1 to the stationary component in the form of a housing G in an actuated state. Consequently, the first hollow gear shaft HR1 is fixed in a stationary position. Shift positions two to five and the function remain unchanged compared to the embodiment shown in FIG. 9. The fifth shift position of the sliding sleeve SM is shown in FIG. 10. Otherwise, the exemplary embodiment according to FIG. 10 corresponds to the exemplary embodiment according to FIG. 9, to which reference is made.

Figure 11:
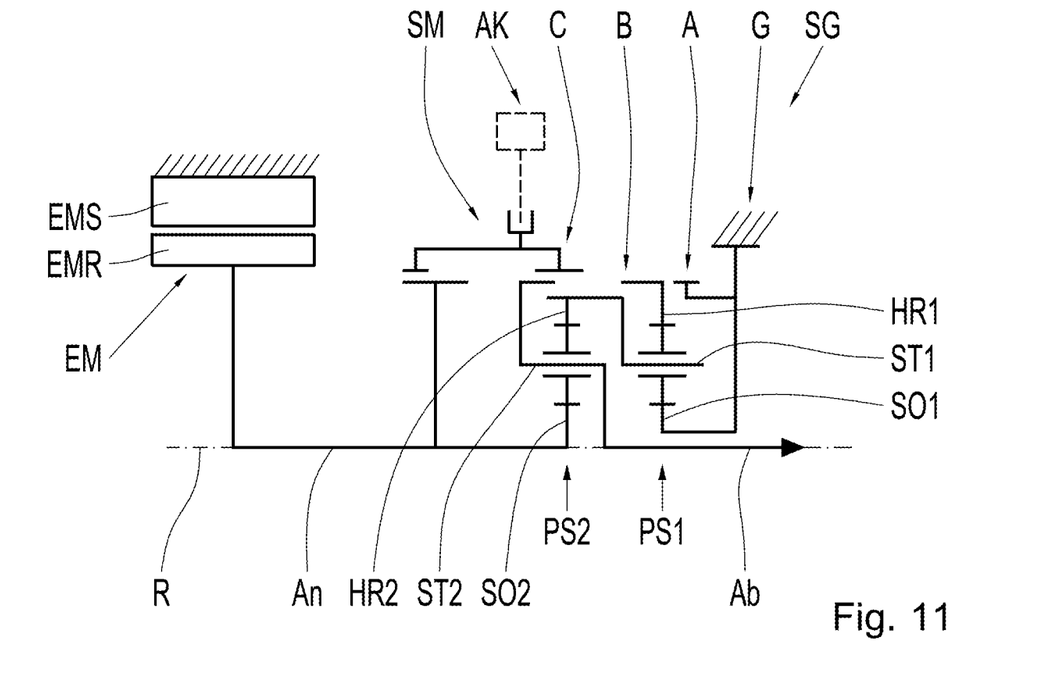
FIG. 11 a highly abstract schematic view of a drive unit according to the invention according to a tenth embodiment.

FIG. 11 shows a tenth embodiment of a drive unit according to the invention. The drive unit according to FIG. 11 essentially corresponds to the drive unit according to FIG. 10, wherein there is a difference between these two embodiments in the representation or realization of the third gear. This embodiment represents a locking variant for the second planetary gear set PS2. In order to shift to a third gear, the third shift element C connects the second web shaft ST2 with the second sun shaft SO2 in an actuated state. Shift positions one to four and the function remain unchanged compared to the embodiment shown in FIG. 10. The fifth shift position of the sliding sleeve SM is shown in FIG. 11. Otherwise, the exemplary embodiment according to FIG. 11 corresponds to the exemplary embodiment according to FIG. 10, to which reference is made.

Figure 12:
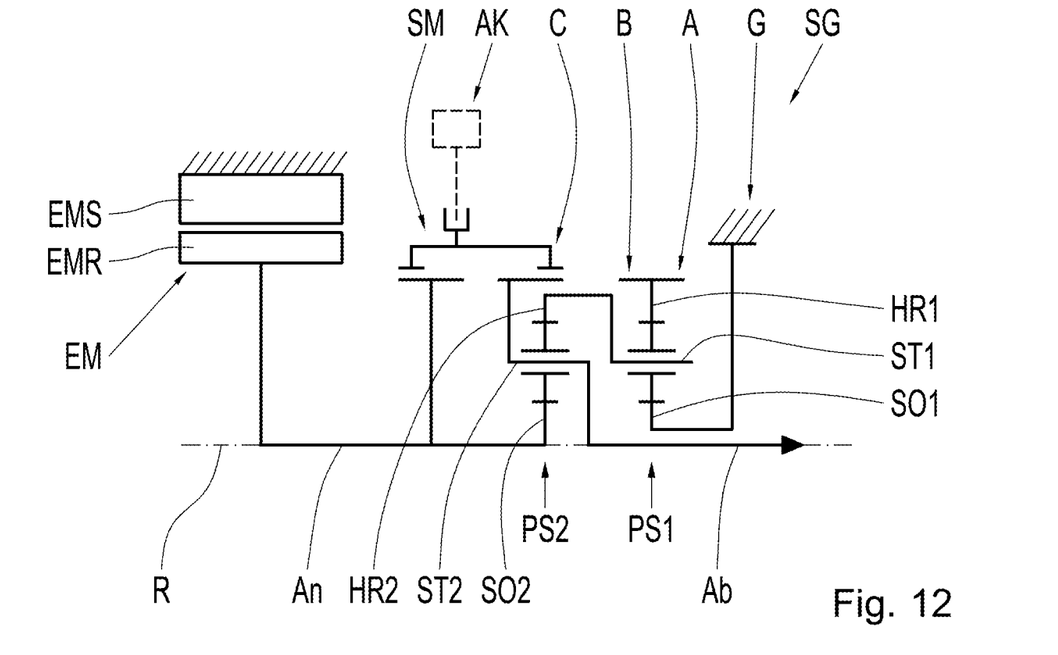
FIG. 12 a highly abstract schematic view of a drive unit according to the invention according to an eleventh embodiment.

FIG. 12 shows an eleventh embodiment of a drive unit according to the invention. The drive unit according to FIG. 12 essentially corresponds to the drive unit according to FIG. 11, wherein there is a difference between these two embodiments in the representation or realization of the first gear. In order to shift a first gear, the first shift element A connects the first ring gear shaft HR1 with the second web shaft ST2 in an actuated state. Shift positions two to five and the function remain unchanged compared to the embodiment shown in FIG. 11. The fifth shift position of the sliding sleeve SM is shown in FIG. 12. Otherwise, the exemplary embodiment according to FIG. 12 corresponds to the exemplary embodiment according to FIG. 11, to which reference is made.

LIST OF REFERENCE NUMERALS

An Drive shaft
Ab Output shaft
SG Manual gearbox
100 Vehicle
10 First axis
102 Second axis
R1 Vehicle wheel
R2 Vehicle wheel
R3 Vehicle wheel
R4 Vehicle wheel
EM Electric machine
EMS Stator
EMR Rotor
PS1 First planetary gear set
SO1 First sun shaft
HO1 First hollow gear shaft
ST1 First web shaft
PS2 Second planetary gear set
SO2 Second sun shaft
HO2 Second hollow gear shaft
ST2 Second web shaft
SM Sliding sleeve
A First shift element
B Second shift element
C Third shift element
AK Actuator
G Housing
R Axis of symmetry

The invention claimed is:

1. A drive unit for a vehicle, comprising:
an electric machine; and
a shift gearbox with at least a first shift element, a second shift element, and two planetary gear sets coupled to one another;
wherein:
the first planetary gear set has a first sun shaft, a first ring gear shaft, and a first web shaft;
the second planetary gear set has a second sun shaft, a second ring gear shaft, and a second web shaft;
the second sun shaft can be driven by the electric machine, the second web shaft is set up as an output shaft, and the second ring gear shaft is non-rotatably connected to the first web shaft;
the first sun shaft is non-rotatably connected to a stationary component, the first shift element, in an actuated state, connects the first ring gear shaft to at least one element of the first planetary gear set and at least one element of the second planetary gear set; and
the second shift element, in an actuated state, connects the first ring gear shaft to the second sun shaft or the second web shaft in a rotationally fixed manner in order to shift a second gear.

2. The drive unit for a vehicle according to claim 1, wherein the at least one element of the first planetary gear set is the web shaft of the first planetary gear set and the at least one element of the second planetary gear set is the web shaft or the ring gear shaft of the second planetary gear set.

3. The drive unit for a vehicle according to claim 1, wherein
in an actuated state, the first shift element connects the first ring gear shaft to the first web shaft and the second ring gear shaft in a rotationally fixed manner in order to shift a first gear, and
the second shift element, in an actuated state, connects the first ring gear shaft to the second sun shaft in a rotationally fixed manner in order to shift a second gear.

4. The drive unit for a vehicle according to claim 1, wherein
in an actuated state, the first shift element connects the first ring gear shaft to a stationary component in a rotationally fixed manner in order to shift a first gear, and
the second shift element, in an actuated state, connects the first ring gear shaft to the second sun shaft in a rotationally fixed manner in order to shift a second gear.

5. The drive unit for a vehicle according to claim 1, wherein
in an actuated state, the first shift element connects the first ring gear shaft to the second web shaft in a rotationally fixed manner in order to shift a first gear, and
the second shift element, in an actuated state, connects the first ring gear shaft to the second sun shaft in a rotationally fixed manner in order to shift a second gear.

6. The drive unit for a vehicle according to claim 1, wherein in an actuated state, the first shift element connects the first ring gear shaft to the second web shaft in a rotationally fixed manner in order to shift a first gear, and the second shift element, in an actuated state, connects the second web shaft to the second sun shaft in a rotationally fixed manner in order to shift a second gear.

7. The drive unit for a vehicle according to claim 1, wherein in an actuated state, the first shift element connects the first ring gear shaft to the second web shaft in a rotationally fixed manner in order to shift a first gear, and the second shift element, in an actuated state, connects the first web shaft and the second ring gear shaft to the second web shaft in a rotationally fixed manner in order to shift a second gear.

8. The drive unit for a vehicle according to claim 1, wherein the manual gearbox has a third shift element.

9. The drive unit for a vehicle according to claim 8, wherein:

in an actuated state, the first shift element connects the first ring gear shaft to the first web shaft and the second ring gear shaft in a rotationally fixed manner in order to shift a first gear, the second shift element, in an actuated state, connects the first ring gear shaft to the second web shaft in a rotationally fixed manner in order to shift a second gear, and the third shift element, in an actuated state, connects the first web shaft and the second ring gear shaft to the second web shaft in a rotationally fixed manner in order to shift a third gear.

10. The drive unit for a vehicle according to claim 8, wherein:

in an actuated state, the first shift element connects the first ring gear shaft to a stationary component in a rotationally fixed manner in order to shift a first gear, the second shift element , in an actuated state, connects the first ring gear shaft to the second web shaft in a rotationally fixed manner in order to shift a second gear, and the third shift element, in an actuated state, connects the first web shaft and the second ring gear shaft to the second web shaft in a rotationally fixed manner in order to shift a third gear.

11. The drive unit for a vehicle according to claim 8, wherein:

in an actuated state, the first shift element connects the first ring gear shaft to the first web shaft and the second ring gear shaft in a rotationally fixed manner in order to shift a first gear, the second shift element, in an actuated state, connects the first ring gear shaft to the second sun shaft in a rotationally fixed manner in order to shift a second gear, and the third shift element, in an actuated state, connects the first web shaft and the second ring gear shaft to the second sun shaft in a rotationally fixed manner in order to shift a third gear.

12. The drive unit for a vehicle according to claim 8, wherein:

in an actuated state, the first shift element connects the first ring gear shaft to a stationary component in a rotationally fixed manner in order to shift a first gear, the second shift element, in an actuated state, connects the first ring gear shaft to the second sun shaft in a rotationally fixed manner in order to shift a second gear, and the third shift element, in an actuated state, connects the first web shaft and the second ring gear shaft to the second sun shaft in a rotationally fixed manner in order to shift a third gear.

13. The drive unit for a vehicle according to claim 8, wherein:

in an actuated state, the first shift element connects the first ring gear shaft to a stationary component in a rotationally fixed manner in order to shift a first gear, the second shift element, in an actuated state, connects the first ring gear shaft to the second sun shaft in a rotationally fixed manner in order to shift a second gear, and the third shift element, in an actuated state, connects the second web shaft to the second sun shaft in a rotationally fixed manner in order to shift a third gear.

14. The drive unit for a vehicle according to claim 8, wherein:

in an actuated state, the first shift element connects the first ring gear shaft to the second web shaft in a rotationally fixed manner in order to shift a first gear, the second shift element, in an actuated state, connects the first ring gear shaft to the second sun shaft in a rotationally fixed manner in order to shift a second gear, and the third shift element, in an actuated state, connects the second web shaft to the second sun shaft in a rotationally fixed manner in order to shift a third gear.

15. The drive unit according to claim 1, wherein the first shift element and the second shift element are combined to form a shifting unit with three shift positions, and wherein the shifting unit has a single axially displaceable sliding sleeve.

16. The drive unit according to claim 8, wherein the first shift element, the second shift element, and the third shift element form a shifting unit with five shift positions, and wherein the shifting unit has a single axially displaceable sliding sleeve.

17. The drive unit according to claim 15, wherein the shift unit has a neutral position between two gear positions.

18. The drive unit according to claim 1, wherein all shift elements are configured as positive-locking shift elements.

* * * * *